United States Patent [19]

Song et al.

[11] Patent Number: 5,523,327
[45] Date of Patent: Jun. 4, 1996

[54] PROCESS FOR PREPARING ION EXCHANGE RESINS BY CHLOROMETHYLATION OF CROSSLINKED STYRENE COPOLYMERS IN THE PRESENCE OF SATURATED HYDROCARBON SWELLING AGENTS

[75] Inventors: Cheng Q. Song, Marlton, N.Y.; Albert H. Greer, Haddonfield; Marc E. Halpern, Cherry Hill, both of N.J.

[73] Assignee: Sybron Chemical Holdings Inc., Wilmington, Del.

[21] Appl. No.: 314,077

[22] Filed: Sep. 28, 1994

[51] Int. Cl.⁶ ................................. C08F 8/32; C08J 5/20
[52] U.S. Cl. ..................... 521/32; 521/27; 521/33
[58] Field of Search .................... 521/33, 27, 32

[56] References Cited

U.S. PATENT DOCUMENTS

| | | |
|---|---|---|
| 2,788,330 | 4/1957 | Gilwood et al. . |
| 3,297,595 | 1/1967 | Mindick et al. ............ 521/33 |
| 3,320,218 | 5/1967 | Levine ....................... 521/33 |
| 3,434,979 | 3/1969 | Gregor ....................... 521/33 |
| 3,577,357 | 5/1971 | Winkler ..................... 521/33 |
| 4,209,592 | 6/1980 | Akiyama et al. ........... 521/33 |
| 4,501,526 | 2/1985 | Kuusikko et al. . |
| 5,081,160 | 1/1992 | Strom et al. . |

FOREIGN PATENT DOCUMENTS 51-42093  4/1976  Japan ....................... 521/33

Primary Examiner—Peter F. Kulkosky
Attorney, Agent, or Firm—Harris Beach & Wilcox

[57] ABSTRACT

Ion exchange resins are prepared by a process comprising functionalizing styrene-divinylbenzene copolymers, or other crosslinked vinyl copolymers, by sulfonation or chloromethylation and amination, and achieving high ion exchange capacity and a low degree of resin bead fragmentation, in the presence of hydrocarbon liquids, such as cyclohexane.

9 Claims, No Drawings

PROCESS FOR PREPARING ION EXCHANGE RESINS BY CHLOROMETHYLATION OF CROSSLINKED STYRENE COPOLYMERS IN THE PRESENCE OF SATURATED HYDROCARBON SWELLING AGENTS

BACKGROUND OF THE INVENTION

Ion exchange resins, commercially used in water purification, are generally prepared commercially by performing chemical reactions, such as sulfonation chloromethylation, on styrene-divinylbenzene copolymers, or other crosslinked vinyl copolymers, in the presence of a halogenated hydrocarbon swelling agent. Halogenated hydrocarbons such as 1,2-dichloroethane, 1,2-dichloropropane and methylene chloride are effective swelling agents for styrene-divinylbenzene copolymers, as more tilly described in U.S. Pat. Nos. 5,081,160, 2,788,330 and 4,501,526.

Ion exchange resins, currently commercially prepared using halogenated hydrocarbon swelling agents are used in commercial applications which include purifying drinking water, purifying industrial ultrapure water for the power industry, semiconductor industry and other industries and in other industrial applications.

It is anticipated that control of the use of halogenated hydrocarbons may be mandated by regulatory authorities, since under certain conditions halogenated hydrocarbons may have detrimental effects on health or on the environment. Additionally, halogenated hydrocarbons may be corrosive to equipment used in the manufacture of ion exchange resins and may hinder the ability to recycle streams of reactants in the manufacture of ion exchange resins.

Hitherto, halogenated hydrocarbons were used to swell styrene-divinylbenzene copolymers and other crosslinked vinyl copolymers in sulfonation or chloromethylation, in order to attain a high ion exchange capacity (i.e., a high degree of functionalization) and desirable mechanical properties.

SUMMARY OF THE INVENTION

It is an object in the field to sulfonate or chloromethylate styrene-divinylbenzene copolymer beads without using halogenated hydrocarbon swelling agents while avoiding extensive fragmentation of the beads during sulfonation or chloromethylation followed by amination and obtaining a high ion exchange capacity.

Accordingly, an object of the present invention is to provide a process for producing a cation exchange resin which comprises sulfonating styrene-divinylbenzene or other crosslinked vinyl copolymer beads in the presence of a saturated hydrocarbon liquid.

Another object of this invention is to provide a process for producing an anion exchange resin which comprises chloromethylating styrene-divinylbenzene or other crosslinked vinyl copolymer beads in the presence of a saturated hydrocarbon liquid.

DETAILED DESCRIPTION OF THE PREFERRED INVENTION

In the present invention, a cation exchange resin is obtained by sulfonating a styrene-divinylbenzene or other crosslinked vinyl copolymer in the presence of a saturated hydrocarbon liquid. In another embodiment of the present invention, an anion exchange resin is obtained by chloromethylating a styrene-divinylbenzene or other crosslinked vinyl copolymer in the presence of a saturated hydrocarbon liquid, followed owed by aminating the chloromethylated copolymer.

Examples of the saturated hydrocarbon liquid suitable for use in the present invention include cycloalkanes, alkylcycloalkanes, linear alkanes, branched alkanes or mixtures of these saturated hydrocarbons. Specific examples of the saturated hydrocarbon liquid include cyclohexane, methylcyclohexane, cycloheptane, cyclooctane, cyclopentane, isooctane, hexane, heptane, octane, pentane and mixtures thereof, and preferably cyclohexane.

The novelty and critical aspect of the present invention is to use a saturated hydrocarbon liquid in the sulfonation or chloromethylation reactions, in the production of cation exchange resins and anion exchange resins respectively. It is known that in the production of cation exchange resins and anion exchange resins, halogenated hydrocarbons, such as 1,2-dichloroethane and 1,2-dichloropropane, are usually used to facilitate attaining a high ion exchange capacity (i.e.; high degree of functionalization of sulfonation of styrene-divinylbenzene copolymer or chloromethylation of styrene-divinylbenzene copolymer followed by amination) while avoiding a high degree of resin bead fragmentation. Considering the knowledge in the art, it is surprising that styrene-divinylbenzene copolymer can, in the presence of a saturated hydrocarbon liquid and in the absence of a halogenated hydrocarbon, be sulfonated or chloromethylated and aminated to yield resin beads of high ion exchange capacity and a low degree of bead fragmentation.

Styrene-divinylbenzene copolymers or other crosslinked vinyl copolymers (such as styrene-ethylene glycol dimethacrylate copolymers) used in the present invention are prepared by conventional commercial polymerization procedures which are described in U.S. Pat. Nos. 2,788,330, 3,509,078 and 4,501,526, "Vinyl and Related Polymers," C. Schildknecht, Wiley, N.Y., 1952, pp. 68–75 and "Practical Principles of Ion Exchange Water Treatment," D. Owens, Tall Oaks, Voorhees, N.J., 1985, pp. 24–26), which are all incorporated herein by reference. Such polymerization procedures are routinely carried out by the manufacturers of ion exchange resins and by those skilled in the art. An example of the polymerization procedure is to react styrene and divinylbenzene, by suspension polymerization, in the presence of one or more suitable initiators, water, a suitable suspension system and suitable inhibitors. Such copolymers are used as intermediates in the manufacture of commercial ion exchange resins, sold by Sybron Chemicals, Inc., Birmingham New Jersey, under tradenames and trademarks such as Ionac C-249, Ionac C-251, Ionac ASB-1P, Ionac ASB-2; Ionac Impact™ AG-1P, Ionac Impact™ AG-2, Ionac Impact™ CS-399, Ionac Impact™ CS-398 and others.

Using the conventional procedures described above for preparing styrene-divinylbenzene copolymers, various gel copolymers were prepared having about 3.8% to 10% degree of crosslinking with greater than 94% of the beads having a diameter of about 0.25 mm to 1.2 mm. Macroporous copolymers could also be used as reactants in the present invention.

One embodiment of the functionalization operation comprises charging a reactor with predetermined amounts of styrene-divinylbenzene copolymer and a saturated hydrocarbon liquid, heating, adding sulfuric acid, heating and recovering the product.

Examples of the saturated hydrocarbon liquid used in the sulfonation are cycloalkanes, alkylcycloalkanes, linear alkanes, branched alkanes or mixtures of these saturated hydrocarbons. Specific examples of a suitable saturated hydrocarbon liquid include cyclohexane, cycloheptane, cyclooctane, cyclopentane, hexane, heptane, octane and pentane, preferably cyclohexane.

The amount of saturated hydrocarbon liquid used in the sulfonation is about 90 to 130 weight %, preferably about 100 to 120 weight %, per weight of the styrene-divinylbenzene copolymer. If the amount thereof is too small, the copolymer beads cannot be well sulfonated to provide adequate ion exchange capacity and provide a smooth surface and provide a low degree of bead fragmentation. If the amount thereof is too large, the amount of copolymer charged to the sulfonator decreases and the yield per batch decreases.

The concentration of the sulfuric acid used in the sulfonation is that suitable to affect sulfonation, preferably 93 to 99% w/w. The amount of sulfuric acid used is about 3 to 30 times the weight of the copolymer, and preferably about 4 to 6 times the weight of the copolymer. The sulfonation is carried out usually at a temperature of about 50° C. to 160° C., for about 2 to 30 hours, preferably about 135° C. to 160° C. for about 3 to 5 hours.

In the sulfonation, the degree of crosslinking of the copolymer is usually from about 4% to about 12%.

The sulfonation is usually carried out at atmospheric pressure. When high boiling saturated hydrocarbon liquids are used, the sulfonation is preferably carried out under reduced pressure to aid in the removal of the saturated hydrocarbon liquid during the sulfonation.

The sulfonated copolymer beads are filtered and washed in the conventional manner, then as required, are converted from the H-form to Na-form Since the copolymer beads are produced with a high ion exchange capacity and since the copolymer beads are not fragmented to a great extent in the sulfonation step, and since halogenated solvents are not used in the process, the process of the present invention is very desirable for industrial practice.

Another embodiment of the functionalization operation comprises charging a reactor with predetermined amounts of styrene-divinylbenzene copolymer, catalyst, a saturated hydrocarbon liquid, chloromethylmethylether, followed by heating, and recovering the chloromethylated copolymer. The chloromethylated copolymer is then aminated.

Catalysts suitable for chloromethylation are usually Lewis acid catalysts. Examples of these catalysts include but are not limited to, anhydrous zinc chloride, anhydrous aluminum chloride, anhydrous ferric chloride, ferric oxide, anhydrous stannic chloride, chlorosulfonic acid, sulfuric acid or combinations thereof.

The amount of saturated hydrocarbon liquid used in the chloromethylation is about 2 to 10 times the weight of copolymer, preferably about 2.5 to 4 times the weight of the copolymer. The chloromethylation is carried out usually at a temperature of about 20° C. to 60° C., for about 4 to 20 hours, preferably about 40° C. to 50° C., for about 6 to 10 hours.

Examples of the saturated hydrocarbon liquid used in the chloromethylation are cycloalkanes, alkylcycloalkanes, branched alkanes or mixtures of these saturated hydrocarbons. Specific examples of the saturated hydrocarbon liquid include cyclohexane, methylcyclohexane, cycloheptane, cyclooctane, cyclopentane, isooctane, and preferably cyclohexane.

The amount of chloromethylmethylether used is about 1.5 to 2.8 times the weight of the copolymer, preferably about 1.75 to 2.2 the weight of the copolymer.

In the chloromethylation, the degree of crosslinking of the copolymer is usually about 3% to 8%.

Amination is performed using an amine suitable for preparing an anion exchange resin. Examples of the amine include, but are not limited to, trialkylamine, such as trimethylamine, triethylamine, tripropyl amine, methyldiethylamine, etc.; dialkylamine, such as dimethylamine; and other amines such as dimethylethanol amine. The amount of amine used is about 0.3 to 1.0 times the weight of the chloromethylated styrene-divinylbenzene copolymer, preferably about 0.4 to 0.6 times the weight of the chloromethylated styrene-divinylbenzene copolymer.

Prior to amination, the chloromethylated styrene-divinylbenzene copolymer is drained and part of the remaining liquid is removed by distillation. The amination can also be performed after the chloromethylated styrene-divinylbenzene copolymer is drained, without further removal of liquid by distillation.

Since the copolymer beads are produced with a high ion exchange capacity and since the copolymer beads are not fragmented to a great extent in the chloromethylation and amination steps, and since halogenated solvents are not used in the process, the process of the present invention is very desirable for industrial practice.

The present invention is described in more detail by reference to the following examples and comparison examples, which however, should not be construed as limiting the scope of the present invention.

EXAMPLE 1

To a two-liter, four-neck flask, equipped with a stirrer, a thermocouple probe, a heating mantel, a temperature controller, a dropping funnel and a condenser were added 162 g of styrene-divinylbenzene copolymer (10% degree of crosslinking)-and 180 g of a liquid shown in Table 1. The diameter of 96.5% of the copolymer beads was 0.3 mm to 1.2 mm. While stirring at 150rpm, the reactor was heated to 83° C. over 20 minutes, then held at 83° C. for 10 minutes, then held at 83° C. for an additional 10 minutes during which 225 g of 80% $H_2SO_4$ was added, then heated to 120° C over 50 minutes during which 488 g of 99% $H2SO_4$ was added, then held at 120° C. for 10 minutes, then heated to 135° C. during 20 minutes, then held at 135° C. for 4 hours. The resin was then hydrated and isolated by conventional procedure. The resulting nine resins had ion exchange capacities and percent spherical beads shown in Table. 1.

TABLE 1

| Liquid | Ion Exchange Capacity per gram of resin (meq/g) | Percent spherical beads |
|---|---|---|
| cyclohexane | 5.0 | 100% |
| cycloheptane | 3.8 | 93% |
| cyclooctane | 3.1 | 100% |
| cyclopentane | 3.1 | 94% |
| hexane | 3.9 | 100% |
| heptane | 3.9 | 95% |
| octane | 4.0 | 100% |
| isooctane | 3.3 | 89% |
| methylcyclohexane | 3.0 | 89% |

EXAMPLE 2

To a two-liter, four-neck flask, equipped with a stirrer, a thermocouple probe, a heating mantle, a temperature controller, a dropping funnel and a condenser were added 150 g of styrene-divinylbenzene copolymer (8% degree of crosslinking) and 180 g of cyclohexane. The diameter of 94% of the copolymer beads was 0.3 mm to 1.2 mm. While stirring at 150 rpm, the reactor was heated to 83° C. over 20 minutes, then held at 83° C. for 10 minutes then held at 83° C. for an additional 10 minutes during which 225 g of 80% $H_2SO_4$ was added, then heated to 120° C. over 50 minutes during which 488 g of 99% $H_2SO_4$ was added, then held at 120° C. for 10 minutes, then heated to 150° C. over 20 min, then held at 150° C. for three hours. The resin was then hydrated and isolated by conventional procedure. The resulting resin had an ion exchange capacity of 4.6 meq/g and 100% spherical beads.

EXAMPLE 3

Example 1 was repeated except that the heating from 83° C. to 120° C. was performed under vacuum (standard water aspirator). The resulting resins had ion exchange capacities and percent spherical beads shown in Table 2.

TABLE 2

| Liquid | Ion Exchange Capacity per gram of resin (meq/g) | Percent Spherical beads |
| --- | --- | --- |
| cycloheptane | 3.7 | 95% |
| cyclooctane | 3.7 | 100% |

EXAMPLE 4

Chloromethylation: To a 3-liter four necked jacketed flask equipped with a flat blade stirrer, a dropping funnel, a thermometer, a temperature controller and a water cooled condenser were added 112 g anhydrous $ZnCl_2$, 1.2 g $Fe_2O_3$ and 200 g styrene-divinylbenzene copolymer (4% degree of crosslinking). The diameter of 99% of the copolymer beads was 0.25 mm to 0.6 mm. To the flask was then added 590 mL of the liquid hydrocarbon shown in Table 3. The mixture was allowed to stand for 20 minutes without stirring. To the flask was added 385 mL chloromethylmethylether, through the dropping funnel and agitation was started. The reaction mixture was heated to 50° C. over one hour, then held at 50° C. for 10 hours. The excess reactants were gradually decomposed with water. The mixture was heated and distilled until the liquid saturated hydrocarbon, or azeotropic mixture, was removed. The chloromethylated styrene-divinylbenzene copolymer was transferred to a Buctmer funnel, filtered, drained and washed with 500 mL of water. The resin was filtered, washed with 500 mL of water and drained. Amination: To a one liter pressure vessel, equipped with a magnetic stirrer device, a thermometer, a pressure gauge and a temperature controller were added 150 g chloromethylated styrene-divinylbenzene copolymer, 250 mL of water and 120 g of sodium chloride. While agitating the mixture, 220 mL of 25% trimethylamine in water was added dropwise. The reaction vessel was sealed. The reaction mixture was heated to 50° C. and held at this temperature for ten hours. The resin was isolated by filtration, acidified with dilute hydrochloric acid, washed and drained. The properties of the nine resulting resins are shown in Table 3.

TABLE 3

| Liquid | Ion Exchange Capacity per gram of resin (meq/g) | Percent spherical beads |
| --- | --- | --- |
| cyclohexane | 3.7 | 100% |
| cycloheptane | 3.6 | 100% |
| cyclooctane | 4.0 | 98% |
| cyclopentane | 3.9 | 98% |
| hexane | 3.2 | 75% |
| heptane | 1.3 | 50% |
| octane | 2.7 | 0% |
| isooctane | 3.2 | 98% |
| methylcyclohexane | 3.2 | 100% |

EXAMPLE 5

Chloromethylation: To a 3-liter four necked jacketed flask equipped with a flat blade stirrer, a dropping funnel, a thermometer, a temperature controller anal a water cooled condenser were added 112 g anhydrous $ZnCl_2$, 1.4 g $Fe_2O_3$ and 200 g styrene-divinylbenzene copolymer (3.8% degree of crosslinking). The diameter of 99% of the copolymer beads was 0.25 mm to 0.6 mm. To the flask was then added 590 mL of cyclohexane. The mixture was allowed to stand for 20 minutes without stirring. To the flask was added 385 mL chloromethylmethylether, through the dropping thnnel and agitation was started. The reaction mixture was heated to 50° C. over one hour, then held at 50° C. for 10 hours. The excess reactants were gradually decomposed with water. The chloromethylated styrene-divinylbenzene copolymer was transferred to a Buchner funnel, filtered, drained and washed with 500 mL of water. Amination: To a one liter pressure vessel, equipped with a magnetic stirrer device, a thermometer, a pressure gauge and a temperature controller were added one half of the weight of the above chloromethylated resin. To the vessel was added 220 mL of 25% trimethylamine in water, with agitation. The reaction vessel was sealed and heated to 50° C. and held at this temperature for four hours. The reaction mixture was cooled and was acidified to pH 3 with dilute hydrochloric acid. The mixture was heated and distilled until the azeotropic mixture was removed. The resin was filtered, washed with 500 mL water and drained. The final resin product had an ion exchange capacity of 4.0 meq/g and 100% spherical beads.

EXAMPLE 6

Chloromethylation: To a 3-liter four necked jacketed flask equipped with a flat blade stirrer, a dropping funnel, a thermometer, a temperature controller and a water cooled condenser were added 85 g anhydrous $ZnCl_2$, 1.4 g $Fe_2O_3$ and 200 g styrene-divinylbenzene polymer (6% degree of crosslinking). The diameter of 93.5% of the copolymer beads was 0.25 mm to 0.6 mm. To the flask was then added 500 mL of cyclohexane. The mixture was allowed to stand for 20 minutes without stirring. To the flask was added 300 mL chloromethylmethylether, through the dropping funnel and agitation was started. The reaction mixture was heated to 50° C. over one hour, then held at 50° C. for 10 hours. The excess reactants were gradually decomposed with water. The chloromethylated styrene-divinylbenzene copolymer was transferred to a Buchner funnel, filtered, drained and washed with 500 mL of water.

Amination: To a two liter three necked flask equipped with a stirrer, thermometer, a dropping funnel and a temperature controller were added 189 g chloromethylated styrene-divinylbenzene copolymer and 250 mL of water. While agitating the mixture, 125 mL dimethylethanolamine was added dropwise. The reaction mixture was heated to 90° C and held at this temperature for two hours. The mixture was cooled to 25° C. and 800 mL of water was added. The mixture was acidified to pH 3 with 25% sulfuric acid. The mixture was heated and distilled until the liquid saturated hydrocarbon, or azeotropic mixture, was removed. The resin was filtered, washed with 500 mL of water and drained. The final resin product had an ion exchange capacity of 3.3 meq/g and 97% spherical beads.

The resins produced by the present invention do not contain halogenated hydrocarbons in any concentration, and therfore do not present the potential health and environmental problems associated with these swelling agents.

While the invention has been described in detail and with reference to specific embodiments thereof, it will be apparent to one skilled in the art that various changes and modifications can be made therein without departing from the spirit and scope thereof.

What is claimed is:

1. A process for producing an anion exchange resin which comprises first chloromethylating, via a Friedel-Crafts reaction, styrene-divinylbenzene copolymer, or other crosslinked styrene copolymer, in the form of solid beads, substantially in the presence of a suitable saturated hydrocarbon liquid swelling agent which is selected from the group consisting of cyclohexane, methylcyclohexane, cycloheptane, cyclooctane, cyclopetane, isooctane, hexane, heptane, octane, pentane, and mixtures thereof, wherein the amount of saturated hydrocarbon liquid used is about 2 to 10 times the weight of the copolymer, a catalyst and chloromethylmethylether, wherein the amount of chloromethylmethylether used is about 1.5 to 2.8 times the weight of the copolymer and the chloromethylation temperature is about 20° C. to 60° C. for a period of about 2 to 20 hours followed by aminating the chloromethylated styrene-divinylbenzene or other crosslinked vinyl copolymer, with an amine, wherein the number of spherical anion exchange resin beads produced thereby per 100 resin beads is 90 or more.

2. A process as claimed in claim 1, wherein the amount of saturated hydrocarbon liquid used is about 2.5 to 4 times the weight of the copolymer, the chloromethylation temperature is about 40° C. to 50° C., for about 6 to 10 hours.

3. A process as claimed in claim 1, wherein the degree of crosslinking of the copolymer is about 3% to 12%.

4. A process as claimed in claim 1, wherein the amination is performed after draining the chloromethylated copolymer and removing part of the remaining liquid by distillation.

5. A process as claimed in claim 1, wherein the amination is performed after draining the chloromethylated copolymer without removing part of the remaining liquid by distillation.

6. A process as claimed in claim 1, wherein the amine is a member selected from the class consisting of a tertiary aliphatic amine, a secondary aliphatic amine or an alkanolamine.

7. A process as claimed in claim 1, wherein the amine is trimethylamine, dimethylamine or dimethylethanolamine.

8. A process as claimed in claim 1, wherein the resulting anion exchange resin beads have a bead diameter of about 0.25 to 1.4 mm.

9. The product produced by the process of claim 1.

\* \* \* \* \*